United States Patent
Suleman et al.

(10) Patent No.: US 11,205,238 B1
(45) Date of Patent: Dec. 21, 2021

(54) PRIVATE DIGITIZED, DECENTRALIZED AND DISTRIBUTED CONTROLLED-ENVIRONMENT FACILITY LEDGER SYSTEMS AND METHODS

(71) Applicant: Securus Technologies, Inc., Carrollton, TX (US)

(72) Inventors: Shuaib Suleman, Plano, TX (US); Adam Christopher Edwards, Fort Worth, TX (US); Danny C. Milliorn, Waxahachie, TX (US)

(73) Assignee: Securus Technologies, LLC, Carrollton, TX (US)

( * ) Notice: Subject to any disclaimer, the term of this patent is extended or adjusted under 35 U.S.C. 154(b) by 158 days.

(21) Appl. No.: 16/363,737

(22) Filed: Mar. 25, 2019

(51) Int. Cl.
| | |
|---|---|
| G06Q 50/26 | (2012.01) |
| G06F 16/23 | (2019.01) |
| G06Q 20/38 | (2012.01) |
| H04L 9/06 | (2006.01) |
| G06Q 20/36 | (2012.01) |

(52) U.S. Cl.
CPC ......... *G06Q 50/26* (2013.01); *G06F 16/2365* (2019.01); *G06Q 20/36* (2013.01); *G06Q 20/3827* (2013.01); *H04L 9/0643* (2013.01); *G06Q 2220/00* (2013.01); *H04L 2209/38* (2013.01); *H04L 2209/56* (2013.01)

(58) Field of Classification Search
CPC .... G06Q 50/26; G06Q 20/36; G06Q 20/3827; G06Q 2220/00; G06F 16/2365; H04L 9/0643; H04L 2209/38; H04L 2209/56
USPC .......................................................... 705/64
See application file for complete search history.

(56) References Cited

U.S. PATENT DOCUMENTS

| | | | |
|---|---|---|---|
| 10,530,578 B2 * | 1/2020 | Keshava | G06F 21/604 |
| 10,536,278 B1 * | 1/2020 | Donaldson | G06F 21/64 |
| 2018/0041336 A1 * | 2/2018 | Keshava | G06F 21/33 |
| 2018/0315309 A1 * | 11/2018 | Becker | H04L 9/0643 |
| 2019/0004863 A1 * | 1/2019 | Mainali | G06F 9/505 |

(Continued)

OTHER PUBLICATIONS

Zhumabekuly et al., Security and Privacy in Decentralized Energy Trading Through Multi-Signatures, Blockchain and Anonymous Messaging Streams, IEEE Transactions on Dependable and Secure Computing, vol. 15, No. 5, Sep./Oct. 2018, pp. 840-852 (Year: 2018).*

*Primary Examiner* — James D Nigh
(74) *Attorney, Agent, or Firm* — Fogarty LLP (57) ABSTRACT

A private digitized, decentralized, and distributed controlled-environment facility ledger is created using a genesis hash and wallet code assigned to a controlled-environment facility resident upon intake of the resident into the facility. In response to an occurrence of a first controlled-environment facility transaction with respect to the resident, a first new hash containing a cryptographic hash of the genesis hash is built, and the ledger is updated to reflect the first transaction, and to associate the first new hash with the first transaction, both with respect to the resident. Thereafter, subsequent new hashes, each containing a cryptographic hash from each prior hash, are each built in response to each subsequent controlled-environment facility transaction with respect to the resident, and the ledger is updated to reflect each subsequent transaction, and associate each subsequent new hash with the respective subsequent transaction, both with respect to the resident.

20 Claims, 3 Drawing Sheets

(56) References Cited

U.S. PATENT DOCUMENTS

2019/0068465 A1* 2/2019 Khanal .................. H04L 43/04
2020/0403775 A1* 12/2020 Huang .................. H04L 9/0643

* cited by examiner

PRIVATE DIGITIZED, DECENTRALIZED AND DISTRIBUTED CONTROLLED-ENVIRONMENT FACILITY LEDGER SYSTEMS AND METHODS

TECHNICAL FIELD

The present disclosure relates generally to controlled-environment facilities, more particularly to monitoring controlled-environment facility residents, and specifically to private digitized, decentralized and/or distributed controlled-environment facility ledger systems and methods.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

In a controlled-environment facility, such as within a correctional facility, such as a prison or jail, controlling access, information, interaction, and/or transactions is often of particular interest. In a correctional facility in particular, safety and security are of paramount importance and, therefore, the number one job of the personnel thereof is to effectively implement controls with respect to the residents (inmates) thereof. However, such controlled-environment facilities often operate not unlike a small city in which a number of individuals work and live, thus requiring various goods and/or services associated with civilized society. Accordingly, various exchanges of information, money, goods, etcetera, may be performed in association with individuals of a controlled environment, both within the controlled-environment facility and external thereto. For example, an inmate residing in a correctional facility may wish to acquire commissary items, such as toiletries, bed linens, clothing, and food items. However, facilitating and administrating exchanges of information, money, goods, etcetera, with respect to a controlled environment facility, such in association with each of the foregoing examples, is often costly and time consuming and can be very difficult to track.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which maintain a private digitized, decentralized, and distributed controlled-environment facility ledger. Therein, a controlled-environment facility administration and management system, and/or the like, creates a genesis hash and wallet code, and assigns the genesis hash and wallet code, in a controlled-environment facility ledger, to a controlled-environment facility resident upon intake of the resident (e.g., an inmate) into the controlled-environment facility (e.g., a correctional facility). The genesis hash and wallet code may be the same.

A first new hash containing a cryptographic hash of the genesis hash is built, in response to an occurrence of a first controlled-environment facility transaction with respect to the resident. The controlled-environment facility ledger is updated to reflect the first controlled-environment facility transaction with respect to the resident, and to associate the first new hash with the first controlled-environment facility transaction with respect to the resident.

Thereafter, subsequent new hashes are built, each containing a cryptographic hash from the first new hash and then each subsequent prior new hash. Each of these subsequent new hashes are built in response to each subsequent controlled-environment facility transaction with respect to the resident. The controlled-environment facility ledger is updated to reflect each subsequent controlled-environment facility transaction with respect to the resident, and to associate each subsequent new hash with the respective subsequent controlled-environment facility transaction with respect to the resident.

Such controlled-environment facility transactions may be an initial financial transaction, an evidentiary transaction, a controlled-environment facility resident movement, a usage transaction, or the like. In turn, an initial financial transaction may be a purchase, utilization of funds, a non-resident funding a controlled-environment facility trust account maintained to the benefit of the resident, a resident deposit into such and account, a credit into such and account, a payment out of such and account, a debit out of such and account, or the like.

An evidentiary transactions may be a resident communication, which includes a voice phone call, a video call, an e-message, a chat, an inmate request, or the like. Usage transactions may be a purchase of stamps, usage of the stamps, purchases of "corrections currency," spending of "corrections currency," or the like.

To audit transactions with respect to the resident a transaction of interest with respect to the resident is identified in the controlled-environment facility ledger, the new hash associated with the transaction is identified, and the transaction of interest is confirmed by working back through the hashes which represent persistent records in the ledger chains, per wallet. In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to controlled-environment facilities, more particularly to monitoring controlled-environment facility residents, and specifically to private digitized, decentralized and/or distributed controlled-environment facility ledgers. In accordance with embodiments of the present systems and methods, maintaining a private digitized, decentralized, and distributed controlled-environment facility ledger creates a genesis hash and wallet code, and assigns the genesis hash and wallet code to a controlled-environment facility resident upon intake of the resident into the controlled-environment facility, in a controlled-environment facility ledger. In response to an occurrence of a first controlled-environment facility transaction with respect to the resident, a first new hash containing a cryptographic hash of the genesis hash is built, and the ledger is updated to reflect the first transaction with respect to the resident, and to associate the first new hash with the first transaction with respect to the resident. Thereafter, subsequent new hashes, each containing a cryptographic hash from each prior hash, are each built in response to each subsequent controlled-environment facility transaction with respect to the resident, and the ledger is updated to reflect each subsequent transaction with respect to the resident and associate each subsequent new hash with the respective subsequent transaction with respect to the resident.

The present systems and methods offer embodiments of a private distributed controlled-environment facility ledger with full transaction logging for all transactions including controlled-environment facility resident (inmate) movement. Embodiments of the present systems and methods provide such a private digitized, decentralized, distributed ledger for controlled environment facilities by tracing all transactions through a hash algorithm/token.

Such transactions may include initial financial transactions, which in turn may include, non-resident (e.g. friend and family) funding into controlled-environment facility trust accounts, or the like, maintained to the benefit of the resident, purchasing, utilization of funds, etc. Other initial transactions may include controlled-environment facility resident (inmate) deposits, credits, payments, debits, etc. into and out of controlled-environment facility trust accounts, or the like, maintained to the benefit of the resident.

Transactions traced under embodiments of the present systems and methods may also include "evidentiary" transactions, such as controlled-environment facility resident (inmate) communications, including, phone calls (voice or video), e-messages, inmate requests, etc. Other "transactions" traced under embodiments of the present systems and methods may include controlled-environment facility resident (inmate) movement traceability. "Usage transactions" may involve purchase of stamps and/or (just) usage of the stamps. Other usage transaction may provide traceability of purchases of a "corrections currency" (private corrections cryptocurrency) and the spending of such coin, such as to receive phone calls from inmates or communicate via eMessages, or purchasing video visitation sessions, renting a tablet, purchasing music, movies, games, etc., via such a corrections currency, built upon a chain of transaction ID's and/or a chain of hashes built off of previous hashes.

Figure 1:
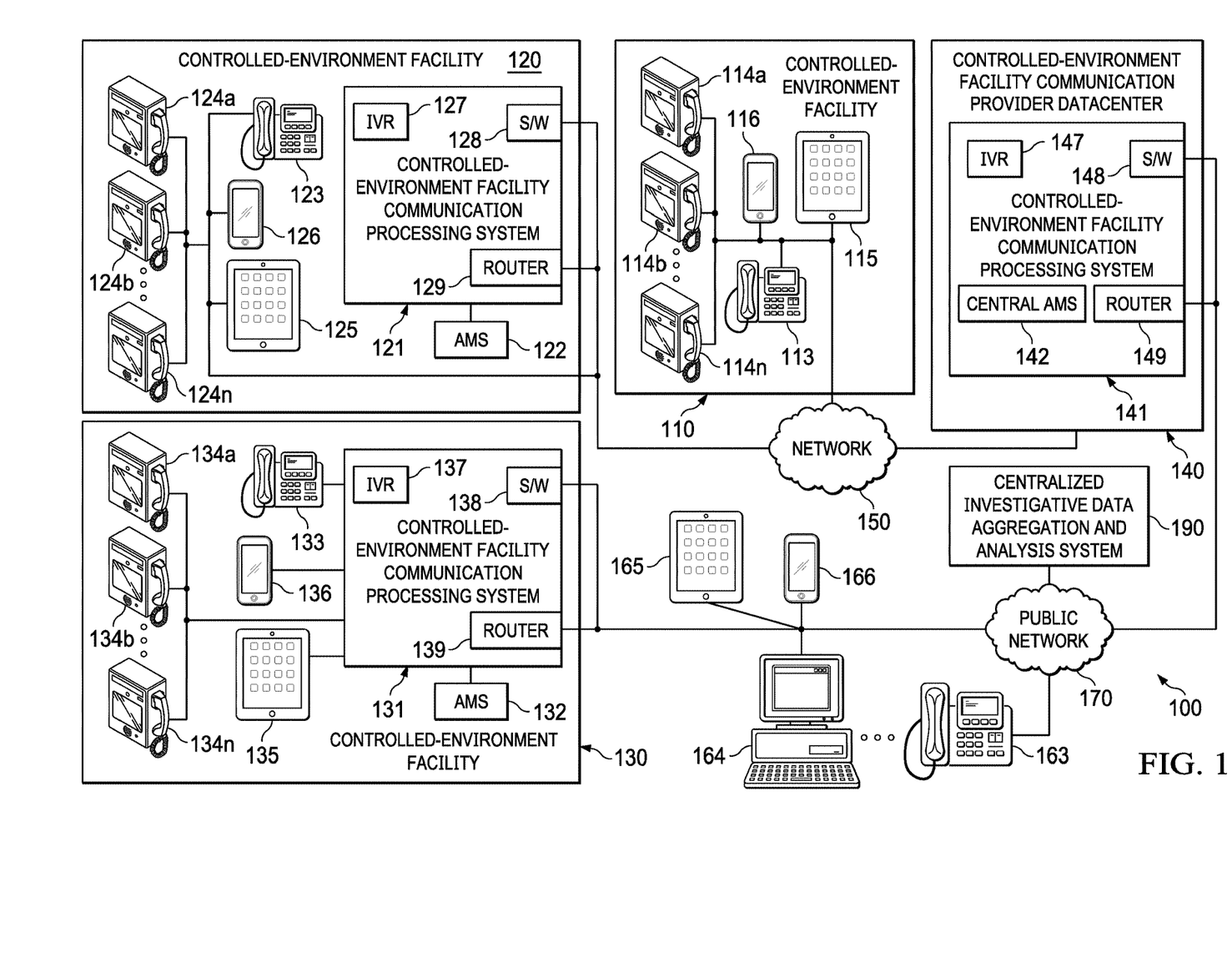
FIG. 1 is a diagrammatic illustration of an example controlled-environment facility environment, wherein an example embodiment of the present systems and methods for providing private digitized, decentralized and/or distributed controlled-environment facility ledger may be deployed, in accordance with some embodiments.

FIG. 1 is a diagrammatic illustration of example controlled-environment facility environment 100, wherein an example embodiment of the present systems and methods for providing private digitized, decentralized and/or distributed controlled-environment facility ledger may be deployed, for example with respect to multiple controlled-environment facilities 110, 120, etc., and/or a single controlled-environment facility (130), in accordance with some embodiments. Therein, onsite Administration Management System (AMS) 122, 132 (or a Jail Management System (JMS) in correctional environment embodiments), and/or external centralized AMS 142 garner information used in accordance with various embodiments of the present systems and methods. In other embodiments, where the (central) controlled-environment facility communication system (141) is located remotely with respect to the controlled-environment facility (110, 120, etc.), access to AMS (or JMS) 122, 132, etc. may (also) be obtained via a computer network such as, for example, network 150, for gathering information used in accordance with various embodiments of the present systems and methods.

In the context of a correctional facility, the respective JMS or AMS databases may include information such as balances for inmate trust and calling accounts; trial schedule; conviction data; criminal record; sentencing data, time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates. In accordance with embodiments of the present systems and methods the AMS or JMS provide and maintain the providing private digitized, decentralized and/or distributed controlled-environment facility ledger.

In some embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate/resident management (including managing inmate information and tracking inmate activity).

In accordance with embodiments of the present systems and methods, controlled-environment facility AMS 122, 132, etc. (e.g. a JMS with respect to correctional facilities), associated with at least one controlled-environment facility 120, 130 may maintain information with respect to the residents of the respective controlled-environment facility. An external remote AMS (142) may maintain information with respect to residents of one or more controlled-environment facilities (e.g. 110, 120).

Onsite communication processing system 121, 131, external centralized communication processing system 141, such as may be deployed in a controlled-environment facility communications provider data center (140), or the like may provide telephone services, videoconferencing, online chat, e-messaging, and other communication services to residents of respective controlled-environment facility 110, 120, 130, etc. As illustrated, in some cases, a communication processing system (121, 131) may be co-located with a controlled-environment facility (120, 130, respectively). Alternatively, as also illustrated, a communication processing system (141) may be centrally or remotely located, such as in controlled-environment facility communications provider data center 140 in whole (such as with respect to facility 110) or in part (such as with respect to facility 120). Controlled-environment facility communications provider data center 140, and hence external centralized communication processing system 141, may be connected to such facilities via a public network (e.g. the Internet) or a private network, or the like (e.g. via a secure tunneling protocol over the internet, using encapsulation) (150) and may provide communication services to such multiple controlled-environment facilities. Such controlled-environment facility communication processing systems, particularly when deployed in, or in conjunction with, a controlled-environment facility communications provider data center (140) may be referred to as a "controlled-environment facility secure communication platform," or the like. More generally, however, it should be noted that communication systems 121, 131, 141, etc. may assume a variety of forms, comprising, including and/or embodying telephony switches, such as electronic switching systems, or the like, and/or and may be configured to serve a variety of facilities and/or users, whether within, or outside of, the respective controlled-environment facility.

In some implementations, wherein the controlled-environment facility communication system (121, 131) is located within the controlled-environment facility (120, 130), it may have direct access to a respective AMS (122, 132). In addition to providing certain visitation and communication operations, communication processing systems 121, 131, 141, etc. and/or AMS (or JMS) 122, 132, 142, etc. may attempt to ensure that a resident's calls, video conferences, online chats, e-messaging, etc. are performed only with non-residents whose identities, devices, email addresses, phone numbers, etc. are listed in that resident's Personal Allowed Number (PAN) or Pre-Approved Contact (PAC) list. Each resident's PAN or PAC list may be stored, for example, in a database maintained by respective AMS (or JMS) 122, 132 or 142, or the like. In addition to PAN or PAC list(s), AMS (or JMS) 122, 132 or 142 (databases), or the like, may also store inmate or resident profile data (RPD), as well as visitation rules applicable to each inmate or resident, Communication Detail Records (CDRs), or similar records, for resident phone calls, video visitations, texts, online chats, e-messaging, or the like.

Residents may use more-or-less conventional telephones 113, 123, 133, or the like to access certain communication services, under control of respective communication processing system 121, 131, 141, etc. In accordance with embodiments of the present systems and methods more-or-less conventional telephones 113, 123, 133 may be camera-enabled, or otherwise associated with controlled-environment facility cameras, or the like. Additionally, or alternatively, in some facilities a resident may use an intelligent controlled-environment facility media and/or communications terminal 114a through 114n, 124a through 124n, 134a through 134n, or the like, to place voice calls, as well as for video visitation, under control of respective communication processing system 131, 141, etc. Such an intelligent controlled-environment facility media and/or communications terminal may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an intelligent controlled-environment facility resident media and/or communications device, Intelligent Resident Device (IRD), or the like, and in a correctional institution embodiment, as an intelligent inmate media and/or communications device Intelligent Inmate Device (IID), or the like. As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 121, 131, 141, etc.

Centralized investigative data aggregation and analysis system 190 may provide investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as CDRs), so that an investigator may research them through an archive and may be provided access to internal and/or external criminal databases and/or other sources of useful information.

Embodiments of the present systems and methods may be employed in the above-described environment, such as in a manner described below, with respect to FIG. 2, a flowchart of example process 200 for providing a private digitized, decentralized and/or distributed controlled-environment facility ledger.

Figure 2:
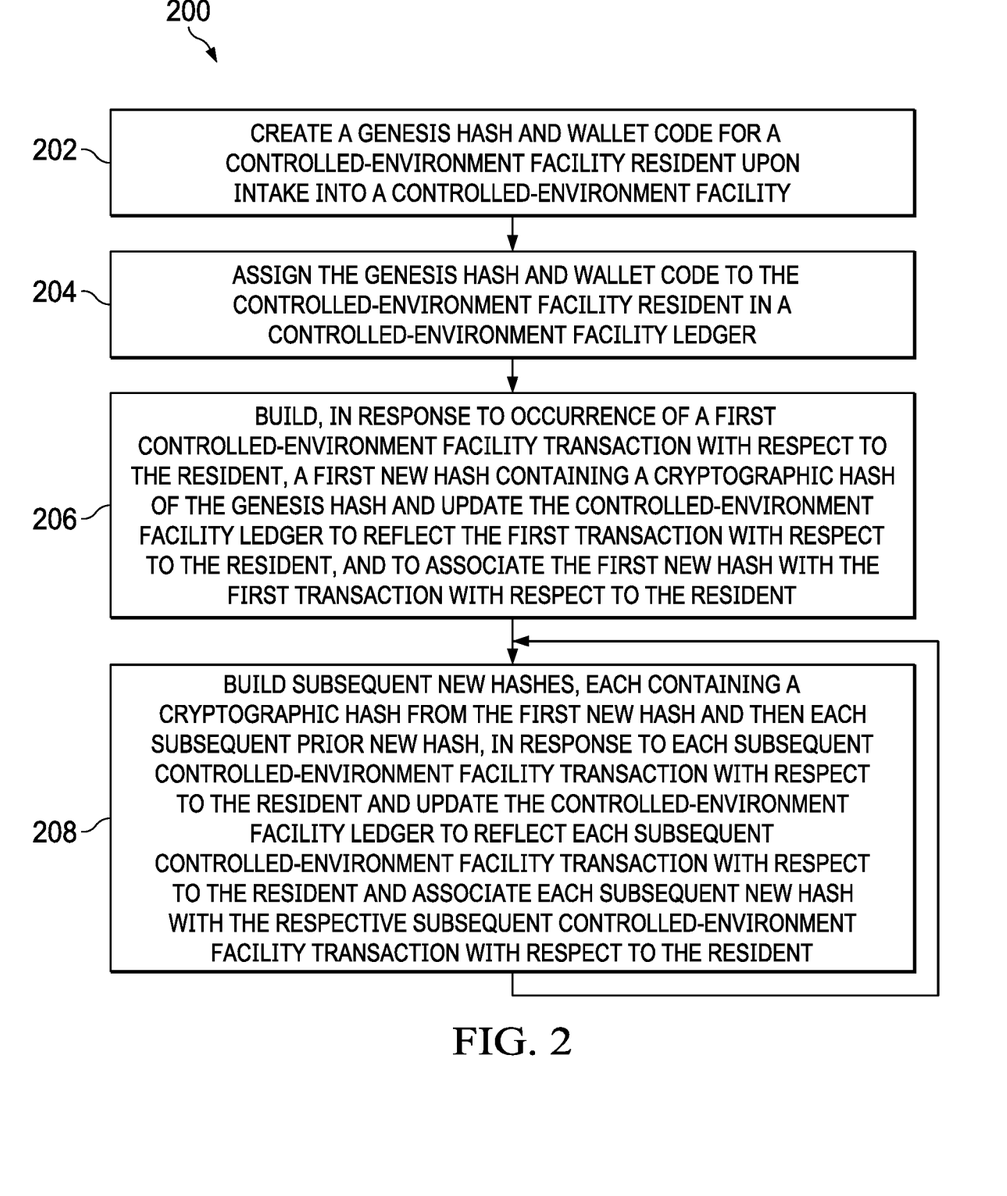
FIG. 2 is a flowchart of an example process for providing private digitized, decentralized and/or distributed controlled-environment facility ledger, in accordance with some embodiments of the present systems and methods.

FIG. 2 is a flowchart of example process 200 for providing private digitized, decentralized and/or distributed controlled-environment facility ledger, in accordance with some embodiments of the present systems and methods. Therein, a controlled-environment facility AMS (122, 132, 142, etc.) (e.g. a JMS with respect to correctional facilities), or the like, associated with at least one controlled-environment facility (110, 120, 130) maintains information with respect to residents of one or more respective controlled-environment facilities, including the present private digitized, decentralized and/or distributed controlled-environment facility ledger(s). At 202, a controlled-environment facility AMS (122, 132, 142, etc.), or the like, creates, upon registration, intake, booking, or the like of the resident (inmate) into the controlled-environment facility, a genesis hash and wallet code for the incoming resident. This genesis hash and wallet code may be the same. At 204 the genesis hash and wallet code are assigned, in a controlled-environment facility ledger, to the respective controlled-environment facility resident.

Similarly, a non-resident may elect to open an account with a controlled-environment facility communications provider, or the controlled-environment facility, at some time after a resident, such as a friend or family member, is booked into the facility. Such an account may be used to pay for communications with the inmate, or pay for other goods (commissary) or services for the resident. Upon opening such an account, a controlled-environment facility AMS (122, 132, 142, etc.), or the like, creates, a genesis hash and wallet code for the non-resident (such as at 202). This genesis hash and wallet code may be the same. Similarly, at

204, the genesis hash and wallet code are assigned, in a controlled-environment facility ledger, to the respective non-resident.

Subsequently, in response to an occurrence of a first controlled-environment facility transaction with respect to the resident (or non-resident), a first new hash containing a cryptographic hash of the (respective) genesis hash is built at 206. Concurrently, at 206 the controlled-environment facility ledger is updated to reflect the first controlled-environment facility transaction with respect to the resident (or non-resident), and to associate the first new (respective) hash with this first controlled-environment facility transaction. As detailed above, such transactions may include an initial financial transaction, an evidentiary transaction, controlled-environment facility resident (inmate) movements (e.g. housing assignment changes), a usage transaction, or the like.

At 208 subsequent (and sequential) new hashes are built, each containing a cryptographic hash from the first new hash and then each subsequent prior new hash. Each of these subsequent new hashes are each built in response to each subsequent controlled-environment facility transaction with respect to the resident (or non-resident). Hence, concurrently, at 208, the controlled-environment facility ledger is updated to reflect each of these subsequent controlled-environment facility transactions with respect to the resident (or non-resident) and to associate each subsequent new hash with the respective subsequent controlled-environment facility transaction with respect to the resident (or non-resident). Step 208 is repeated for each subsequent controlled-environment facility transactions with respect to the resident (or non-resident).

One example of providing a private digitized, decentralized, distributed controlled-environment facility ledger may, in a corrections environment, begin with a new inmate being booked "into the system," such as by having a record created in a controlled-environment facility (jail) administration and management system (122, 132, 142, etc.) (at 204). At this time a "genesis" hash is created for the inmate, such as a "wallet code," or the like (at 202). At this point, the private digitized, decentralized, distributed controlled-environment facility ledger is initiated and updated to reflect the booking of the inmate (at 204). The inmate may then be housed in a temporary housing unit. However, at some point, the inmate is moved from the temporary housing unit to a permanent location within the correctional facility. At this point a new hash is built (e.g. at 206) off the genesis hash which ties the new resulting hash directly to the genesis hash, and hence, the same wallet code. Concurrently (i.e. at 206), the private digitized, decentralized, distributed controlled-environment facility ledger is again updated to reflect the movement and location of the inmate. Further to this example, the inmate may make a phone call to a non-resident (a person who is not a resident of controlled-environment facility (correctional facility) housing the inmate), such as to let the non-resident know he or she is in jail, whereupon a new hash is built (e.g. at 208) off the most recent hash which is chain linked back to the genesis hash. Concurrently, the private digitized, decentralized, distributed controlled-environment facility ledger is again updated (e.g. at 208) to reflect the call.

Further with respect to this example, a non-resident may elect to open an account with a controlled-environment facility communications provider, to pay for communications with the inmate, whereupon a new hash built off of the most recent hash (at 208). Concurrently, the private digitized, decentralized, distributed controlled-environment facility ledger is updated (at 208) to reflect such an account creation.

Thereafter, the non-resident may purchase an amount of corrections currency (private corrections cryptocurrency) or perhaps funds their account with a credit or debit card, either (or each) of which will result in a new hash being built off of the most recent hash (at 208). Concurrently, the private digitized, decentralized, distributed controlled-environment facility ledger is again updated (at 208) to reflect the purchase of the corrections currency and/or the funding of the account by the non-resident, for the inmate. In this example, the non-resident my then use corrections currency to send an e-message to the inmate, which results in a new hash being built off of the most recent hash (at 208). Concurrently, the private digitized, decentralized, distributed controlled-environment facility ledger is again updated (at 208) to reflect use of the corrections currency and what they were used for, to send the e-message to the inmate.

Continuing with this example, when a non-resident funds the inmate's debit account, such as for use in purchasing commissary goods, at a later time, a new hash is built off of the most recent hash upon the account being funded (at 208). Concurrently, the private digitized, decentralized, distributed controlled-environment facility ledger is updated (at 208) to reflect the deposit into the resident's account. The inmate then places phone calls, purchases music, etc. and a new hash is built off of the previous hash at each purchase (at 208), and the private digitized, decentralized, distributed controlled-environment facility ledger is concurrently updated (also at 208) to reflect each such purchase.

If the inmate is eventually released, a new hash is built (at 208) off of the most recent hash, and the private digitized, decentralized, distributed controlled-environment facility ledger is concurrently updated (at 208) to reflect the release. Following release, the inmate may go to a financial services business (Western Union, etc.) and claim a refund of remaining funds in their debit account, such by being provided a debit card with remaining funds, whereupon a new hash is built off of the most recent hash (at 208) and private digitized, decentralized, distributed controlled-environment facility ledger is concurrently updated (at 208) to reflect the withdrawal, then may be closed. Alternatively, the inmate may be enabled to transfer corrections currency to another inmate, at which point a new hash is built off of the most recent hash.

Thereby, a chain of tracking and transparency is maintained alongside the private digitized, decentralized, distributed controlled-environment facility ledger maintaining accounting and traceability from inception of the wallet (at booking), through all transactions for the inmate.

In accordance with the foregoing, embodiments of the present systems and methods improve chain of evidence, improves chain of custody, improves tracking and traceability of inmate movement, improves tracking and traceability of financial transactions related to residents and non-residents of controlled environment facilities, mitigates audit risks and errors in accounting, mitigates reconciliation efforts, etc. To wit, embodiments of the present systems and methods provide traceability of all transactions in and out of controlled-environment facilities and the residents of such facilities as well as the transactions to and from non-residents of the controlled environment facility.

Figure 3:
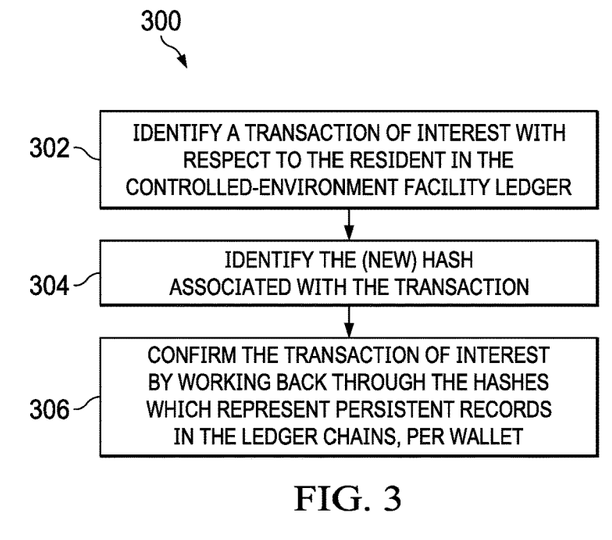
FIG. 3 is a flowchart of an example process to trace, confirm, audit or otherwise review transactions with respect to a controlled-environment facility resident, using the private digitized, decentralized and/or distributed controlled-environment facility ledger, in accordance with some embodiments of the present systems and methods.

FIG. 3 is a flowchart of example process 300 to trace, confirm, audit or otherwise review transactions with respect to the resident using the private digitized, decentralized and/or distributed controlled-environment facility ledger, in accordance with some embodiments of the present systems and methods. The resident (or non-resident) wallet is persistent (i.e. permanent and immutable), and accessible through internal protocols as read only for audit purposes, so as to follow in the ledger. Therein, a transaction of interest with respect to the resident is identified at 302, in the controlled-environment facility ledger. At 304, the hash associated with the transaction is identified, and at 306 the transaction of interest is confirmed by working back through the hashes which represent persistent records in the ledger chains, per wallet, from wallet inception to close out, immutable, un-editable, secure, and accurate.

Figure 4:
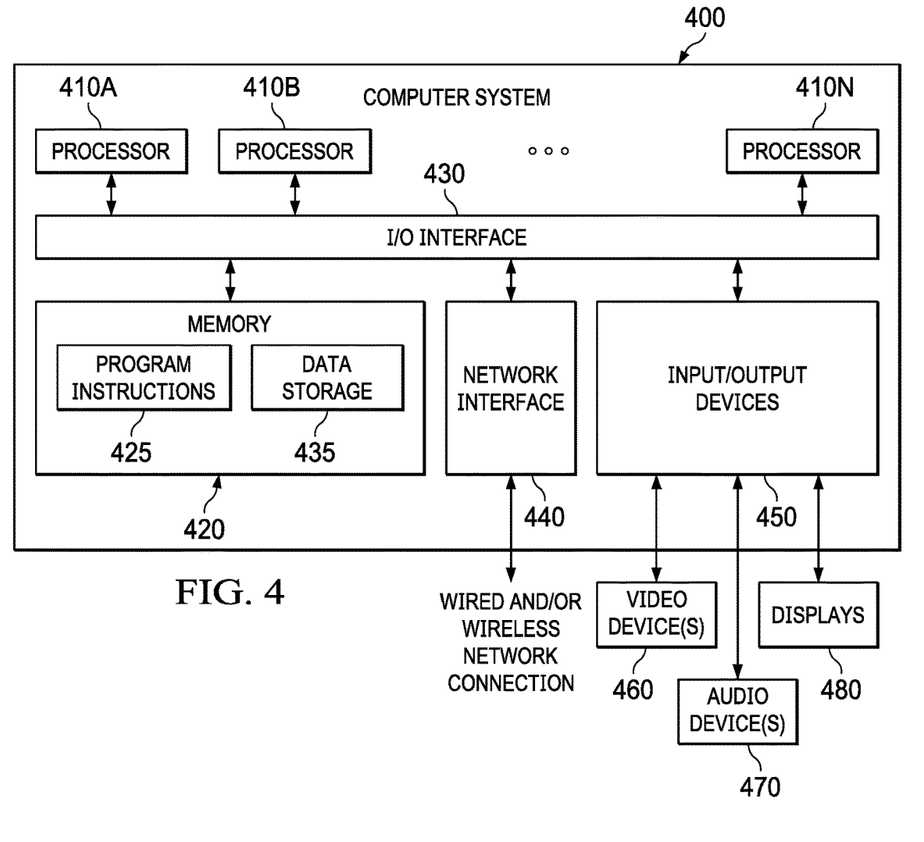
FIG. 4 is a block diagram of a computer system, device, station, or terminal configured to implement various techniques disclosed herein, according to some embodiments.

Embodiments of the present systems and methods for providing private digitized, decentralized and/or distributed controlled-environment facility ledger, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example processes 200 and/or 300 described above with respect to FIGS. 2 and 3, and/or a computer system such as computer system 400 may be used as, or as part of, one or more of: AMSs 122, 132 and 142; controlled environment facility communications management systems 121, 131 and/or 141; centralized investigative data aggregation and analysis system 190; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via a network. For example, in FIG. 1, centralized investigative data aggregation and analysis system 190 is illustrated as communicating with controlled-environment facility communications management systems 121, 131 and 140, via public network 170, which may be the Internet, or the like, as discussed above. Further, users of the present investigative data aggregation and analysis system may communicate therewith via public network 170 (e.g. the Internet) or the like. Likewise, as another example, devices 125 and 135 may communicate with respective controlled-environment facility management systems 121 and 131, such as via a local area network, and/or using wireless functionality.

As illustrated, example computer system 400 includes one or more processors 410 coupled to a system memory 420 via an input/output (I/O) interface 430. Example computer system 400 further includes a network interface 440 coupled to I/O interface 430, and one or more input/output devices 450, such as video device(s) 460 (e.g., a camera), audio device(s) 470 (e.g., a microphone and/or a speaker), and display(s) 480. Computer system 400 may also include a cursor control device (e.g., a mouse or touchpad), a keyboard, etc. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In various embodiments, computer system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 and 2, above, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-readable medium may include any tangible or non-transitory storage media or memory media such as magnetic or optical media—e.g., disk or CD/DVD-ROM coupled to computer system 400 via I/O interface 430, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 440.

In some embodiments, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any suitable protocol, timing or other data transformations to convert data signals from one component (e.g., system memory 420) into a format usable by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments, some or all of the functionality of I/O interface 430, such as an interface to system memory 420, may be incorporated into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks;

via storage area networks such as Fiber Channel SANs, or via any other suitable type of network and/or protocol.

As shown in FIG. 4, memory 420 may include program instructions 425, configured to implement certain embodiments described herein, and data storage 435, comprising various data accessible by program instructions 425. In an embodiment, program instructions 425 may include software elements corresponding to one or more of the various embodiments illustrated in the above figures. For example, program instructions 425 may be implemented in various embodiments using any desired programming language, scripting language, or combination of programming languages and/or scripting languages (e.g., C, C++, C#, JAVA®, JAVASCRIPT®, PERL®, etc.). Data storage 435 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for maintaining a private digitized, decentralized, and distributed controlled-environment facility ledger, the system comprising:
 a controlled-environment facility administration and management system comprising at least one processor and a memory coupled to the at least one processor and storing program instructions thereupon, which when executed by the at least one processor, cause the controlled-environment facility administration and management system to:
  create a genesis hash and wallet code and assigning, in a controlled-environment facility ledger, the genesis hash and wallet code to a controlled-environment facility resident upon intake of the resident in the controlled-environment facility;
  build, in response to occurrence of a first controlled-environment facility transaction with respect to the resident, a first new hash containing a cryptographic hash of the genesis hash;
  update the controlled-environment facility ledger to reflect the first controlled-environment facility transaction with respect to the resident, and to associate the first new hash with the first controlled-environment facility transaction with respect to the resident;
  build subsequent new hashes, each containing a cryptographic hash from the first new hash and then each subsequent prior new hash, each built in response to each subsequent controlled-environment facility transaction with respect to the resident; and
  update the controlled-environment facility ledger to reflect each subsequent controlled-environment facility transaction with respect to the resident and associate each subsequent new hash with the respective subsequent controlled-environment facility transaction with respect to the resident.

2. The system of claim 1, wherein the program instructions, upon execution by the at least one process further cause the controlled-environment facility administration and management system to audit transactions with respect to the resident by:
 identifying a transaction of interest with respect to the resident in the controlled-environment facility ledger;
 identifying the new hash associated with the transaction; and
 confirming the transaction of interest by working back through the hashes which represent persistent records in the ledger chains, per wallet.

3. The system of claim 1, wherein the genesis hash and wallet code are the same.

4. The system of claim 1 wherein the controlled-environment facility is a correctional facility, the resident is an inmate and the intake of the resident in the controlled-environment facility is booking of the inmate into the correctional facility.

5. The system of claim 1, wherein each controlled-environment facility transaction comprises one of:
 an initial financial transaction;
 an evidentiary transaction;
 a controlled-environment facility resident movement; and
 a usage transaction.

6. The system of claim 5, wherein each initial financial transaction comprises one of:
 non-resident funding into a controlled-environment facility trust account maintained to the benefit of the resident;
 a purchase;
 utilization of funds;
 a resident deposit into a controlled-environment facility trust account maintained to the benefit of the resident;
 a credit into a controlled-environment facility trust account maintained to the benefit of the resident;
 a payment out of a controlled-environment facility trust account maintained to the benefit of the resident; and
 a debit out of a controlled-environment facility trust account maintained to the benefit of the resident.

7. The system of claim 5, wherein each evidentiary transactions comprises a resident communication, which includes one of:
 a voice phone call;
 a video call;
 an e-message;
 a chat, and
 an inmate request.

8. The system of claim 5, wherein each usage transaction comprises one of
- purchase of stamps;
- usage of the stamps;
- purchases of corrections currency; and
- spending of corrections currency.

9. A controlled-environment facility administration and management computer system executable method for providing a private digitized, decentralized, and distributed controlled-environment facility ledger, the method comprising:
- creating a genesis hash and wallet code and assigning, in a controlled-environment facility ledger, the genesis hash and wallet code to a controlled-environment facility resident upon intake of the resident in the controlled-environment facility;
- building a first new hash containing a cryptographic hash of the genesis hash in response to occurrence of a first controlled-environment facility transaction with respect to the resident;
- updating the controlled-environment facility ledger to reflect the first controlled-environment facility transaction with respect to the resident, and to associate the first new hash with the first controlled-environment facility transaction with respect to the resident;
- building subsequent new hashes each containing a cryptographic hash from the first new hash and then each subsequent prior new hash, each in response to each subsequent controlled-environment facility transaction with respect to the resident; and
- updating the controlled-environment facility ledger to reflect each subsequent controlled-environment facility transaction with respect to the resident and associate each subsequent new hash with the respective subsequent controlled-environment facility transaction with respect to the resident.

10. The method of claim 9, further comprising auditing transactions with respect to the resident by:
- identifying a transaction of interest with respect to the resident in the controlled-environment facility ledger;
- identifying the new hash associated with the transaction; and
- confirming the transaction of interest by working back through the hashes which represent persistent records in the ledger chains, per wallet.

11. The method of claim 9, wherein the genesis hash and wallet code are the same.

12. The method of claim 9 wherein the controlled-environment facility is a correctional facility, the resident is an inmate, and the intake of the resident in the controlled-environment facility is booking of the inmate into the correctional facility.

13. The method of claim 9, wherein each controlled-environment facility transaction comprises one of:
- an initial financial transaction;
- an evidentiary transaction;
- movement of a controlled-environment facility resident; and
- a usage transaction.

14. The method of claim 13, wherein each initial financial transaction comprises one of:
- non-resident funding into a controlled-environment facility trust account maintained to the benefit of the resident;
- a purchase;
- utilization of funds;
- a resident deposit into a controlled-environment facility trust account maintained to the benefit of the resident;
- a credit into a controlled-environment facility trust account maintained to the benefit of the resident;
- a payment out of a controlled-environment facility trust account maintained to the benefit of the resident; and
- a debit out of a controlled-environment facility trust account maintained to the benefit of the resident.

15. The method of claim 13, wherein each evidentiary transactions comprises a resident communication, which includes one of:
- a voice phone call;
- a video call;
- a chat;
- an e-message; and
- an inmate request.

16. The method of claim 13, wherein each usage transaction comprises one of purchase of stamps;
- usage of the stamps;
- purchases of corrections currency; and
- spending of a corrections currency.

17. A computer readable non-transitory medium having program instructions stored thereon that, upon execution by a controlled-environment facility administration and management system, cause the controlled-environment facility administration and management system to:
- create a genesis hash and wallet code and assigning, in a controlled-environment facility ledger, the genesis hash and wallet code to a controlled-environment facility resident upon intake of the resident in the controlled-environment facility;
- build, in response to occurrence of a first controlled-environment facility transaction with respect to the resident, a first new hash containing a cryptographic hash of the genesis hash;
- update the controlled-environment facility ledger to reflect the first controlled-environment facility transaction with respect to the resident, and to associate the first new hash with the first controlled-environment facility transaction with respect to the resident;
- build subsequent new hashes, each containing a cryptographic hash from the first new hash and then each subsequent prior new hash, each built in response to each subsequent controlled-environment facility transaction with respect to the resident; and
- update the controlled-environment facility ledger to reflect each subsequent controlled-environment facility transaction with respect to the resident and associate each subsequent new hash with the respective subsequent controlled-environment facility transaction with respect to the resident.

18. The computer readable non-transitory medium of claim 17, wherein the program instructions, upon execution by the controlled-environment facility administration and management system, further cause the controlled-environment facility administration and management system to audit transactions with respect to the resident by:
- identifying a transaction of interest with respect to the resident in the controlled-environment facility ledger;

identifying the new hash associated with the transaction; and confirming the transaction of interest by working back through the hashes which represent persistent records in the ledger chains, per wallet.

19. The computer readable non-transitory medium of claim 17, wherein the genesis hash and wallet code are the same.

20. The computer readable non-transitory medium of claim 17, wherein each controlled-environment facility transaction comprises one of:

an initial financial transaction;
an evidentiary transaction;
controlled-environment facility resident movement; and
a usage transaction.

* * * * *